UNITED STATES PATENT OFFICE.

GEORGE REYNOLDS, OF BANGOR, MAINE.

IMPROVEMENT IN COMPOSITIONS FOR TANNING.

Specification forming part of Letters Patent No. 12,102, dated December 19, 1854.

*To all whom it may concern:*

Be it known that I, GEORGE REYNOLDS, of Bangor, in the county of Penobscot and State of Maine, have invented an improvement in preparing skins or hides without depilating them; and I do hereby declare that the same is fully described and represented in the following specification.

My invention has for its object the treatment of a skin in such manner as to convert the skin into leather and to retain upon it its hair. For this purpose I make a composition of one bushel of muriate of soda, one bushel of alum, and six pounds of sulphuric acid. This will be sufficient for about twenty hides. This composition is to be dissolved in about three hogsheads of water. The hides are to be beamed and suffered to steep in the mixture or solution about six weeks. They are then to be removed from it, dried, and stuffed or rubbed with tallow and oil sufficiently to saturate them to such extent as circumstances may require.

The hides are not steeped in tannin liquor; but when finished and prepared as above described are rendered capable of being used as leather, and particularly for the manufacture of moccasins or garments when the hair is worn next the skin of a person.

What I claim is—

The above-described composition for treating hides, substantially as above set forth, or converting them into leather without depilating them.

In testimony whereof I have hereunto set my signature this 28th day of October, 1854.

GEORGE REYNOLDS.

Witnesses:
A. G. WAKEFIELD,
SUPPLY DEAN.